April 5, 1938.                    W. M. BAUMHECKEL                    2,113,167
                                    WATER PUMP SEAL
                                  Filed Sept. 9, 1935                 2 Sheets-Sheet 1

INVENTOR.
WILLIAM M. BAUMHECKEL.
Allen + Allen
ATTORNEYS.

April 5, 1938.  W. M. BAUMHECKEL  2,113,167

WATER PUMP SEAL

Filed Sept. 9, 1935  2 Sheets-Sheet 2

INVENTOR.
WILLIAM M. BAUMHECKEL.
BY Allen + Allen
ATTORNEYS.

Patented Apr. 5, 1938

2,113,167

UNITED STATES PATENT OFFICE 2,113,167

WATER PUMP SEAL

William M. Baumheckel, Cincinnati, Ohio, assignor to B. B. B. Corporation, Detroit, Mich., a corporation of Michigan Application September 9, 1935, Serial No. 39,677

6 Claims. (Cl. 308—36.2)

My invention is an improvement upon the seal shown and described in my United States Patent No. 1,889,397, dated November 29, 1932. The seal there shown is one in which there is located about the impeller shaft a mass of packing material which is driven with the shaft. In sealing contact with the packing material is a washer of condensation product material, which washer is also in sealing contact with a shoulder about the shaft journal in the pump casing. A spring is used which engages the impeller hub and the packing element of the seal, and pushes the entire seal so as to maintain the washer against the packing as well as against the pump casing shoulder.

It will be noted of this structure that an end thrust of the impeller shaft is resisted only by the spring which presses the seal, as above described, and that the spring cannot be too strong to avoid bottoming thereof or the wear on the seal washer will be too great. Thus, in pumps without expensive tapered roller bearings or ball bearings, and using my seal, it has been the practice to provide a thrust bearing for the pump shaft by forming the shaft of a suitable non-corrosive material and forming a thrust shoulder thereon at some point outside of the impeller casing against which a thrust washer is seated. This has been expensive, requires special alloy for the entire shaft, and special lubrication.

It is the object of my invention to provide a simple and effective thrust bearing as a part of the seal of my former patent. By the structure to be illustrated and described, I not only do this, but I avoid the necessity of using a special pump shaft, and enhance the ease of installing the seal instead of making it more difficult.

Figure 1:
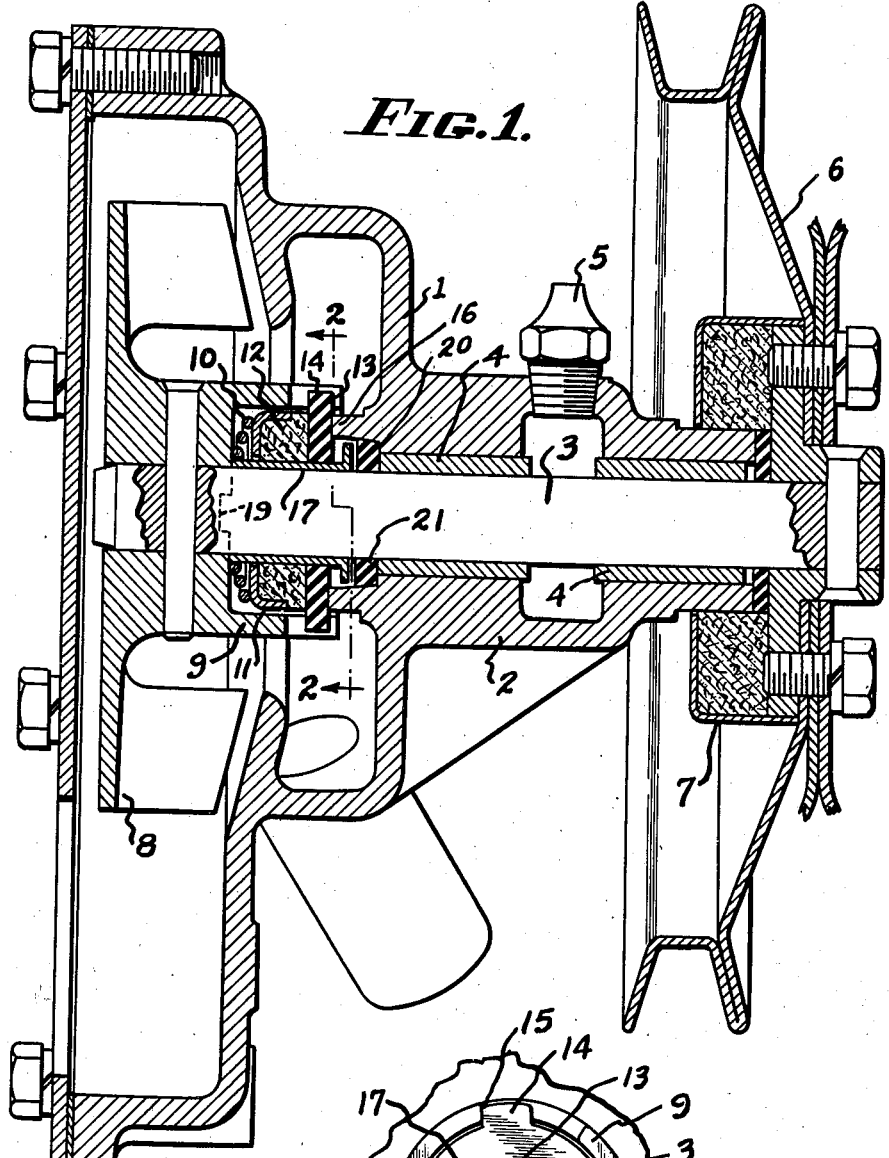
Figure 1 is a longitudinal section approximately full size, of a pump embodying my invention.
Figures 2, 3:
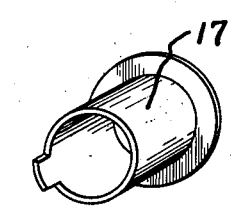
Figure 2 is a cross section on the line 2—2 of Figure 1.
Figure 3 is a perspective of the flanged sleeve which is the thrust receiving element as well as the mounting for the seal.

I have shown a typical water pump as used in motor vehicles. It embodies a pump casing 1, having a journal portion 2 for the impeller shaft 3. There are shown two plain bushings 4 for the shaft between which is a grease orifice in which is fitted a nipple 5. A pulley 6 is mounted on the outer end of the shaft and provided with a packing gland 7.

In the structure shown in Figure 1, the impeller 8 is mounted direct on the impeller shaft, and has a hub projection 9. The seal proper consists of a spring 10 engaging a cup 11 which itself partially houses the packing 12. Engaging the packing is a washer 13 of condensation product material. The washer has peripheral tongues 14 which engage in notches 15 in the edge of the impeller hub flange. The washer engages the shoulder 16 which is formed around the journal orifice in the pump casing.

As so constructed, the washer is maintained in sealing contact with the shoulder and with the packing by the action of the spring. The seal as so far described is the seal of my patent heretofore identified.

Now referring to my improvement in the seal, it will be noted that a sleeve 17 is employed. This sleeve is driven onto the impeller shaft, with the seal as above described mounted over it. The sleeve will be of bronze or suitable hard and non-corrosive metal, and is provided with a flange 18. This flange is so located that it does not interfere with the operation of the seal washer. It will preferably be chrome-plated, which is not necessary for the remainder of the sleeve. In order to assure that the sleeve turns with the shaft, thus causing the seal to rotate also, a tongue 19 on the sleeve may be so arranged that it engages a notch 19a at the hub of the impeller, the latter being pinned to the shaft.

The flange on the sleeve acts as the member to resist the impeller shaft outward thrust. The journal opening in the casing of the pump is provided with a seat 20, surrounding it, from the outer boundary of which seat the shoulder 16 projects. Lying within the annular space between the shoulder and the shaft is a thrust washer 21, preferably also of bakelite, which engages the seat 20 and forms the abutting element for the thrust receiving flange 18.

The spring for the seal does not have to be of great strength in order to keep it from bottoming, due to end thrust, because the thrust bearing will come into play to prevent this. Therefore, the wear on the washer element of the seal is not excessive, as is the case where a strong spring must be employed.

In case end thrust develops, the flange on the seal supporting sleeve engages the thrust washer 21 before the spring can bottom. The oil or grease in the pump casing provides lubricant for the thrust washer.

It should be noted that in assembling the pump, the seal may be assembled over the sleeve, and the sleeve and impeller then placed on the shaft, and the shaft then thrust into the supporting journal, whereupon the face plate of the pump casing can be bolted on. This is a quick and easy assembling method. In the absence of the flange on the sleeve, which prevents the seal from being pushed along the shaft by the spring, this simple mode of installing the shaft could not be followed. Thus, the flanged sleeve not only serves the purpose of taking up impeller thrust, but acts as an implement for use in assembling the pump.

Figure 4:
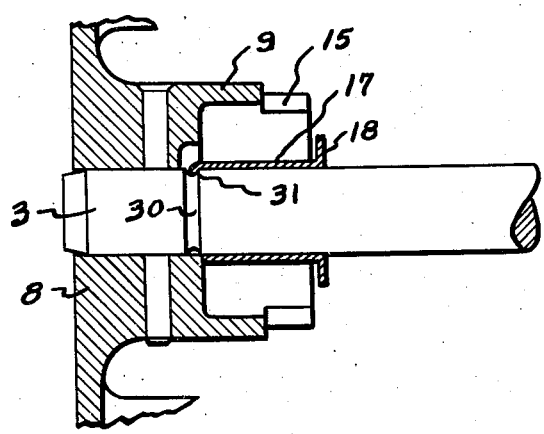
Figure 4 is a detail longitudinal section showing a modified form of sleeve for use where the same might become dislodged from its position.
Figure 5:
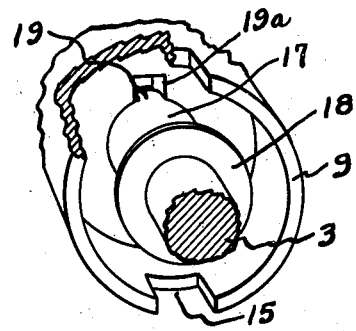
Figure 5 is a perspective detail showing the relation of the sleeve to the impeller hub flange in the modification of Figure 4.

If it is desirable to prevent the sleeve from being displaced longitudinally of the shaft, there may be formed a groove 30 in the impeller shaft. The tongue 19 on the sleeve which engages the notch 19a in the impeller hub may be peened over into the groove 30 as indicated at 31 in Figures 4 and 5.

Figure 6:
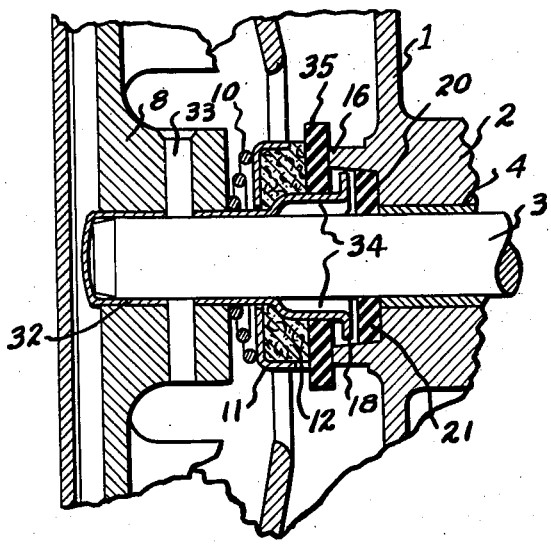
Figure 6 is a longitudinal section showing another modified form of sleeve for use particularly where there is no flange on the hub of the impeller.
Figure 7:
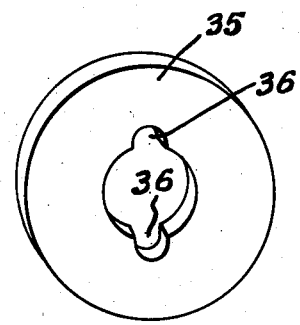
Figure 7 is a perspective of the seal washer in this second modification.
Figure 8:
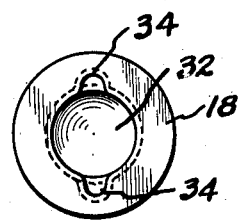
Figure 8 is an end elevation of the sleeve in this second modification.

In the modification shown in Figures 6 to 8, the impeller hub has no flange to form a housing around the seal or to provide notches for engaging and driving the seal washer. In this instance, I arrange the bronze flanged sleeve so that it drives the washer as well as serving the purposes already noticed. Thus, the sleeve is formed as a thimble 32 which is set over the end of the pump shaft. The impeller is mounted over the thimble and the impeller pin 33 passes through the thimble so that it is positively driven with the shaft and held firmly in place. The seal is the same as heretofore described, except that two ribs 34, 34, are formed in the thimble just behind the thrust flange. The seal washer 35, instead of having tongues at its periphery, has notches 36, 36, to engage over the ribs on the thimble. This slidably supports the washer but drives it with the shaft and seal.

An advantage not heretofore noted in connection with my improvement, is that the flanged sleeve or thimble with the seal mounted upon it in proper adjustment, can be sold as a unit to pump manufacturers.

Having thus described my invention, what I claim as new and desire to secure by Letters Patent, is:—

1. A seal for pumps comprising a sleeve to fit the pump shaft within the pump casing and be driven thereby, a flange on said sleeve to act as a thrust member, packing surrounding said sleeve arranged to rotate therewith, a washer engaging said packing and provided with means whereby it is driven with the sleeve, spring means for engaging the packing and pressing the packing and washer toward the flange for the purpose described, and said sleeve provided with means complementary to the means on the washer for driving the same.

2. A seal for pumps comprising a sleeve to fit the pump shaft within the pump casing and be driven thereby, a flange on said sleeve to act as a thrust member, packing surrounding said sleeve arranged to rotate therewith, a washer engaging said packing and provided with means whereby it is driven with the sleeve, spring means for engaging the packing and pressing the packing and washer toward the flange for the purpose described, and said sleeve provided with means complementary to the means on the washer for driving the same, said sleeve being formed of relatively non-corrosive metal.

3. In a rotary water pump, a pump casing having a flange forming a shoulder surrounding the shaft journal opening into the casing, a washer seat within said flange, a shaft, a sleeve slidable on the shaft but arranged to be driven thereby, an impeller, a seal on the sleeve comprising a packing slidable on but in sealing contact with the sleeve, a spring pressing the packing away from the impeller toward the shoulder, a washer driven with the sleeve and held by the spring in sealing contact with the packing and the casing shoulder, and a flange on the sleeve arranged to engage the seat within the shoulder or a washer therebetween, said flange so located as to take the shaft thrust prior to bottoming of the spring.

4. A shaft seal to prevent leakage through a journal opening comprising in combination with a fixed element on the shaft rotating therewith, and a sealing face surrounding a thrust face about the journal opening, a sleeve slidable on the shaft and in driving connection therewith, a flange on said sleeve to cooperate with the thrust face, packing on the sleeve and driven therewith, a washer in contact with the packing, and in contact with the sealing face, and a spring engaging the fixed element, the relative movement of said sleeve necessary to cause engagement of said flange with said thrust face, being less than the limit of compression of said spring.

5. A seal for pumps, comprising a sleeve to slidingly fit the pump shaft within the pump casing and be driven thereby, a packing assembly mounted on said sleeve to rotate therewith, a shoulder on said casing, spring means bearing against the impeller hub and urging said assembly against said shoulder, and means comprising a flange on said sleeve and a thrust collar located to be abutted by said flange in advance of the bottoming of said spring means, whereby end thrust is taken up without affecting said packing assembly.

6. A seal for water pumps having a casing provided with a flange forming a shoulder surrounding the shaft journal opening into the casing, comprising a washer seat within said flange, a sleeve slidable on the pump shaft but arranged to be driven thereby, a packing slidable on but in sealing contact with the sleeve, a spring pressing the packing away from the pump impeller toward the shoulder, a washer driven with the sleeve by means coacting with complementary means on said impeller and held by the spring in sealing contact with the packing and the casing shoulder, and a flange on the sleeve arranged to engage the seat within the shoulder or a washer therebetween, said flange so located as to take the shaft thrust prior to bottoming of the spring.

WILLIAM M. BAUMHECKEL.